UNITED STATES PATENT OFFICE.

MORIZ WEINRICH, OF ST. LOUIS, MISSOURI.

PURIFYING AND MANUFACTURING SACCHARINE SOLUTIONS.

SPECIFICATION forming part of Letters Patent No. 475,025, dated May 17, 1892.

Application filed November 20, 1890. Serial No. 372,066. (No specimens.)

*To all whom it may concern:*

Be it known that I, MORIZ WEINRICH, of St. Louis, in the State of Missouri, have invented certain new and useful Improvements in Purifying and Manufacturing Saccharine Solutions; and I do hereby declare that the following is a full, clear, and exact description of the invention, which will enable others skilled in the art to which it appertains to make and use the same.

Sugar-cane, sorghum-cane, or sugar-beets comminuted into slices or chips or into a meal and then dried can be used with advantage as a filtering material for sugar solutions, and their native or inherent sugar contents can also be extracted simultaneously with such filtering and with little or no expense. In working this material in the state of slices or chips I put the dried slices or chips into closed filtering-vessels of about the same size and kind as those used for charcoal and which can be connected among themselves to a battery. The hot sugar solution is now allowed to run over the chips under pressure. By diffusing itself through the cells of the chips the liquor deposits all its foreign matters held in suspension and becomes entirely bright, dissolving and extracting at the same time the sugar normally contained in the chips themselves. The liquor by taking up the sugar and other soluble matter of the chips increases in its density, according to the amount of chips over or through which it is run. Therefore the density of the original liquor to be purified has to be regulated in such a way that the liquor drawn off from the filters shall reach the desired density. As soon as a sufficient amount of liquor has passed through the chips the inflow of the liquor is stopped and the chips are edulcorated in the same way as is practiced with bone-charcoal. If the material be used in the shape of a meal or flour, it can be extracted either in the same way as described above or its native or inherent sugar contents may be mixed thoroughly with the hot sugar solutions in suitable tanks provided with agitators and the mixture pumped under continuous stirring into filter-presses, whence the liquor runs off entirely bright and clear. The cakes which will form in the press are then lixiviated in the usual way and the exhausted meal then remaining, with all the retained mechanical impurities, taken out of the press. The acidity of the sugar solutions has to be regulated by adding the necessary amount of lime. The exhausted chips or meal can be dried again and used for some other purpose.

I do not claim as new the mere extraction of sugar from or out of cane, sorghum, or sugar-beets by means of water, as I am aware that is quite old and well known to sugar manufacturers.

Having now particularly described and ascertained the nature of my said invention and in what manner the same is to be performed, I declare that what I claim is—

The described process of filtering and purifying saccharine solutions and at the same time increasing their density, consisting in mixing the hot solution with meal of sugar-containing cane or beets and passing the mixture through filtering-presses, as and for the purposes set forth.

MORIZ WEINRICH.

Witnesses:
WILLIAM RUEGER,
WM. F. KOTTEMANN.